United States Patent
Rangarajan et al.

(10) Patent No.: US 9,838,243 B2
(45) Date of Patent: Dec. 5, 2017

(54) TRANSFORMATIVE REQUESTS

(71) Applicant: Telefonaktiebolaget L M Ericsson (publ), Stockholm (SE)

(72) Inventors: Hari Rangarajan, San Jose, CA (US); Yvan Royon, San Jose, CA (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 429 days.

(21) Appl. No.: 14/667,545

(22) Filed: Mar. 24, 2015

(65) Prior Publication Data
US 2016/0285671 A1    Sep. 29, 2016

(51) Int. Cl.
  *G06F 15/16* (2006.01)
  *H04L 12/24* (2006.01)
  *H04L 29/08* (2006.01)

(52) U.S. Cl.
  CPC ........ *H04L 41/0233* (2013.01); *H04L 67/327* (2013.01)

(58) Field of Classification Search
  CPC .......................... H04L 41/0233; H04L 67/327
  USPC ................................................. 709/245, 223
  See application file for complete search history.

(56) References Cited

U.S. PATENT DOCUMENTS

| | | |
|---|---|---|
| 2007/0143242 A1 | 6/2007 | Miller et al. |
| 2009/0287835 A1 | 11/2009 | Jacobson |
| 2011/0185016 A1 | 7/2011 | Kandasamy et al. |
| 2012/0327931 A1 | 12/2012 | Esteban et al. |
| 2014/0149733 A1* | 5/2014 | Kim ................. H04L 67/1097 713/153 |
| 2014/0201374 A1 | 7/2014 | Ashwood-Smith et al. |
| 2014/0310375 A1* | 10/2014 | Jeon ................. H04L 67/2814 709/217 |
| 2015/0271267 A1 | 9/2015 | Solis et al. |
| 2016/0014234 A1* | 1/2016 | Oran ................. H04L 45/742 709/203 |
| 2016/0043960 A1* | 2/2016 | Solis ................. H04L 67/10 709/223 |
| 2016/0105394 A1 | 4/2016 | Rangarajan et al. |
| 2016/0119194 A1* | 4/2016 | Valencia Lopez ...... H04L 41/50 709/223 |

(Continued)

FOREIGN PATENT DOCUMENTS

EP    2214357 A1    8/2010

OTHER PUBLICATIONS

"Transmission Control Protocol; DARPA Internet Program; Protocol Specification", *RFC 793*; Sep. 1981; 85 pages.

(Continued)

*Primary Examiner* — Philip B Tran
(74) *Attorney, Agent, or Firm* — Patent Portfolio Builders, PLLC

(57) ABSTRACT

A method is implemented by a node for implementing computational transformations conveyed in a content centric networking (CCN) request by a computation engine. The method includes receiving a CCN request containing a unique resource identifier (URI) and a computation field, decoding the computation field to determine a computation pipeline, retrieving a first content object identified by the URI, executing the computation pipeline with the first content object as input, and encoding a result of the computation pipeline as a second content object.

24 Claims, 11 Drawing Sheets

(56) References Cited

U.S. PATENT DOCUMENTS

2016/0224799 A1* 8/2016 Uzun .................. G06F 21/6227

OTHER PUBLICATIONS

Ali, Z., et al., "Node-IDS Based Resource Reservation Protocol (RSVP) Hello: A Clarification Statement", *Network Working Group; RFC 4558, The Internet Society*, (Jun. 2006), 7 pages.
Andersson, L., et al., "LDP Specification", *Network Working Group; RFC 5036*; Oct. 2007; 135 pages.
Awduche, D., et al., ""RSVP-TE: Extensions to RSVP for LSP Tunnels,"", *Network Working Group; RFC 3209*; Dec. 2001; 61 pages.
Babiarz, J., et al., "Configuration Guidelines for DiffServ Service Classes", *Network Working Group, Request for Comments: 4594, The Internet Society*, (Aug. 2006), 57 pages.
Baker, F., et al., "A Differentiated Services Code Point (DSCP) for Capacity-Admitted Traffic", *Internet Engineering Task Force (IETF); RFC 5865*; May 2010; 14 pages.
Baker, F., et al., "Management Information Base for the Differentiated Services Architecture", *Network Working Group, Request for Comment*; 3289, May 2002, 116 pages.
Berger, L., "Generalized Multi-Protocol Label Switching (GMPLS) Signaling Resource ReserVation Protocol-Traffice Engineering (RSVP-TE)", *Network Working Group; RFC 3473*; Jan. 2003; 42 pages.
Bernet, Y., et al., "An Informal Management Model for Diffserv Routers", *Network Workinf Group, Request for Comments: 3290, The Internet Society*, (May 2002), 56 pages.
Black, D., "*Differentiated Services and Tunnels*," Oct. 2000, 14 pages, *Network Working Group, Request for Comments: 2983, The Internet Society*.
Black, D., et al., "*Per Hop Behavior Identification Codes*," Jun. 2001, 8 pages, *Network Working Group, Request for Comments: 3140, The Internet Society*.
Blake, S., et al., "An Architecture for Differentiated Services", Dec. 1998, 36 pages, *Network Working Group, Request for Comments; 2475, The Internet Society*.
Borman, D., et al., "IPv6 Jumbograms", *Network Working Group, Request for Comments: 2675*, Aug. 1999, 9 pages.
Braden, R., et al., ""Resource ReSerVation Protocol (RSVP)—Version 1 Functional Specification,"", *Network Working Group, RFC 2205*; Sep. 2007; 112 pages.
Chan, K., et al., "Differentiated Services Quality of Service Policy Information Base", *Network Working Group, Request for Comments: 3317, The Internet Society*, (Mar. 2003), 96 pages.
Charny, A., et al., "Supplemental Information for the New Definition of the EF PHB (Expedited Forwarding Per-Hop Behavior)", *Network Working Group, Request for Comments: 3247, The Internet Society*, (Mar. 2002), 24 pages.
Coltun, R., et al., "OSPF for IPv6", *Network Working Group, Request for Comments: 5340*, Jul. 2008, 95 pages.
Davie, B., et al., "An Expedited Forwarding PHB (Per-Hop Behavior)", *Network Working Group, Request for Comments: 3246, The Internet Society*, (Mar. 2002), 16 pages.
Deering, et al., "Internet Protocol", *IETF RFC 2460, version 6 (IPv6) Specification*, Dec. 1998, 37 pages, http://www.ietf.org/rfc/rfc2460.txt.
Eggert, L., et al., "Unicast UDP Usage Guidelines for Application Designers", *Network Working Group, Request for Comments: 5405, IETF Trust*, (Nov. 2008), 27 pages.
Fenner, B., et al., "Management Information Base for the User Datagram Protocol (UDP)", *Network Working Group, Request for Comments: 4113, The Internet Society*, (Jun. 2005), 19 pages.
Grossman, D., "New Terminology and Clarifications for Diffserv", *Network Working Group; RFC 3260*; Apr. 2002; 10 pages.

Hedrick, C., "Routing Information Protocol", *Network Working Group; RFC 1058*; Jun. 1988; 33 pages.
Heinanen, J., et al., "Assured Forwarding PHB Group", *Network Working Group, Request for Comments: 2597, The Internet Society.*, (Jun. 1999), 11 pages.
Housley, "Using Advanced Encryption Standard (AES) CCM Mode with IPsec Encapsulating Security Payload (ESP)", *Network Working Group, Request for Comments: 4309, The Internet Society*, (Dec. 2005), 13 pages.
Kent, et al., "Security Architecture for the Internet Protocol", *Network Working Group, Request for Comments: 4301, The Internet Society*, (Dec. 2005), 101 pages.
Kompella, K., et al., "Procedures for Modifying the Resource reSerVation Protocol (RSVP)", *Network Working Group; RFC 3936, The Internet Society*, (Oct. 2004), 7 pages.
Malkin, G., "RIP Version 2", *Network Working Group, Request for Comments: 2453*, Nov. 1998, 40 pages.
Malkin, G., et al., "RIPng for IPv6", *Network Working Group; RFC 2080*, (Jan. 1997), 19 pages.
Mosko, Marc, "CCNx 1.0 Protocol Specification Roadmap", *PARC*; Apr. 14, 2014 (rev 3); 4 pages.
Mosko, Marc, "Labeled Segment Uls ccnx-mosko-labeledsegments-01", *IETF*;http://www.ccnx.org/pubs/ccns-mosko-labeledsegments-01.txt; Jul. 20, 2014; 12 pages.
Moy, J., ""OSPF Version 2,"", Apr. 1998, 244 pages, *Network Working Group, Request for Comments 2328, The Internet Society*.
Nichols, K., et al., "*Definition of the Differentiated Services Field (DS Field) in the IPv4 and IPv6 Headers*," Dec. 1998, 20 pages, *Network Working Group, Request for Comments: 2474, The Internet Society*.
Nichols, K., et al., "*Definition of Differentiated Services Per Domain Behaviors and Rules for their Specification*," Apr. 2001, 24 pages, *Network Working Group, Request for Comments: 3086, The Internet Society*.
Oran, David, "OSI ISIS Intra-domain Routing Protocol", *Network Working Group, Request for Comments: 1142*, Feb. 1990, 206 pages.
Polk, J., et al., "A Resource Reservation Protocol (RSVP) Extension for the Reduction of Bandwidth of a Reservation Flow", *Network Working Group; RFC 4495, The Internet Society*, (May 2006), 21 pages.
Postel, J. ""User Datagram Protocol",", *STD 6, RFC 768*, Aug. 1980.
Rekhter, Y., et al., ""A Border Gateway Protocol 4 (BGP-4)",", *RFC 4271*, Jan. 2006.
Rosen, et al., *Network Working Group; RFC 4364; ;BGP/MPLS IP Virtual Private Networks (VPNs)*,' copyright The Internet Society (2006); Feb. 2006; 47pgs.
Shenker, S., et al., "Specification of Guaranteed Quality of Services", *Network Working Group; RFC 2212*, (Sep. 1997), 20 pages.
Socolofsky, T., et al., "A TCP/IP Tutorial", *Network Working Group, Request for Comments: 1180*, (Jan. 1991), 28 pages.
Wroclawski, J., "Specification of the Controlled-Load Network Element Service", *Network Working Group; RFC 2211*; Sep. 1997; 19 pages.
Wroclawski, J., "The Use of RSVP with IETF Integrated Services", *Network Working Group; RFC 2210*; Sep. 1997; 33 pages.
Goergen, et al., "A Semantic Firewall for Content-Centric Networking," 2013 IFIP/IEEE International Symposium on Integrated Network Management (IM 2013), May 27, 2013, pp. 478-484.
Jacobson, et al., "Networking Named Content," CoNEXT '09, 5th International Conf. on Emerging Networking Experiments and Technologies, Dec. 1-4, 2009, 12 pages.
Tschudin, 'The "Named Function Networking" project,' downloaded via Internet Archive on Apr. 15, 2016 http://www.named-function.net/, as published Sep. 4, 2014 at 1 page.

\* cited by examiner

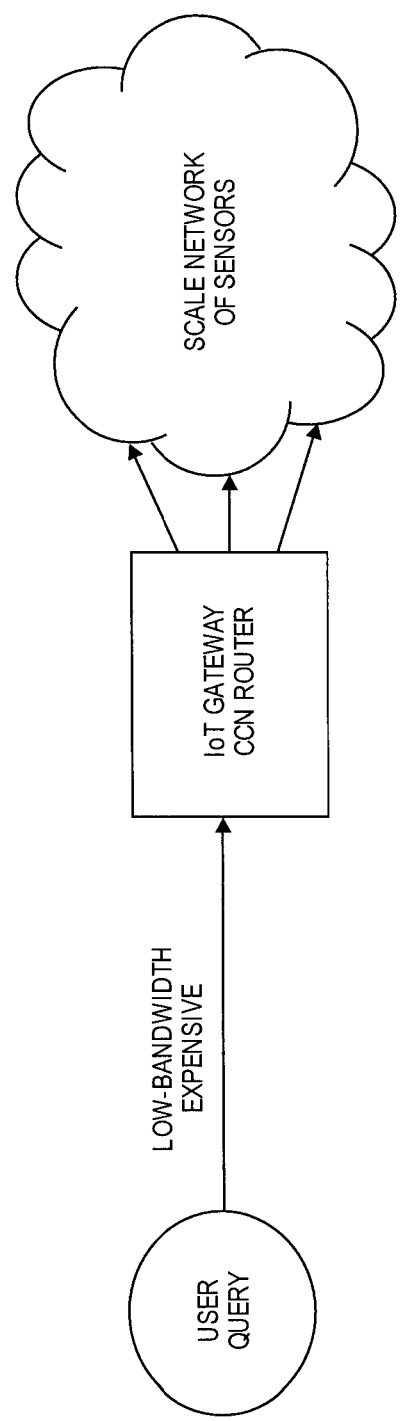

FIG. 7C
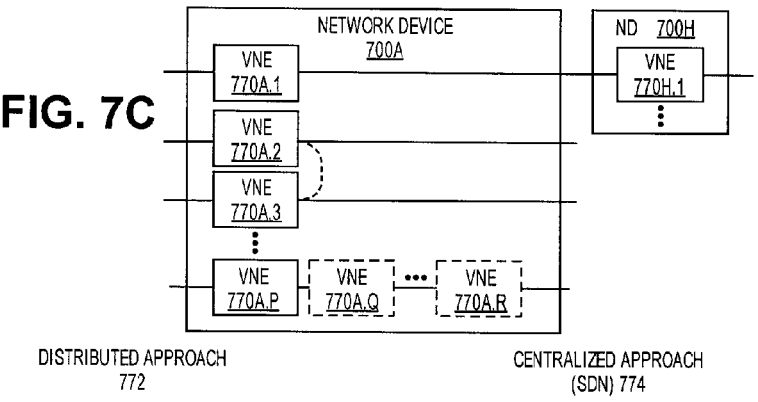
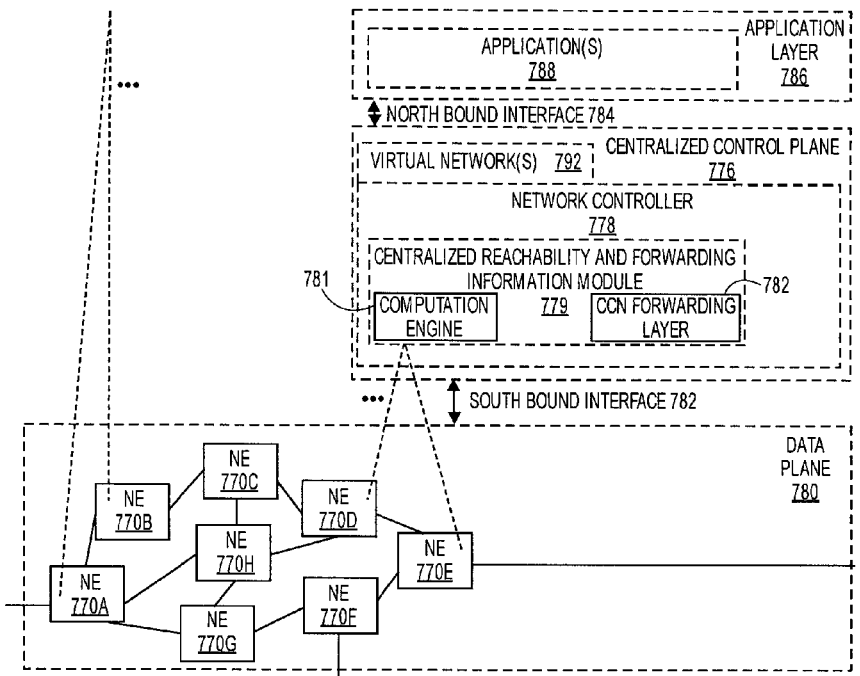
FIG. 7D
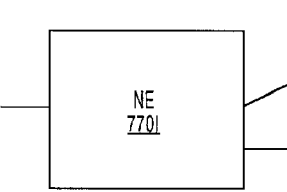
FIG. 7E
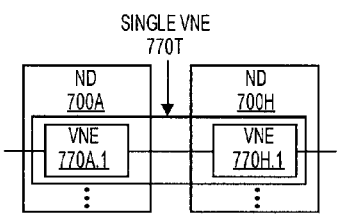
FIG. 7F

TRANSFORMATIVE REQUESTS

FIELD

Embodiments of the invention relate to supporting transformational functions for content centric networking (CCN) requests. Specifically, the embodiments relate to a method and system implemented by nodes in a CCN network to enable decoding of functions, execution of functions and encapsulation of content objects resulting from these functions to be returned as CCN responses.

BACKGROUND

An information centric network (ICN) is a conceptualization of networking protocol stack, in particular layers 3 and above of a network protocol stack. A CCN is a particular architecture and implementation of an ICN. ICNs and CCNs are based on the premise of naming resources in these networks. In particular the naming relates to the use of a globally shared namespace for objects that allows entities in these networks to retrieve any content of interest.

Thus, with a CCN a name is utilized to identify a content object instead of an Internet Protocol (IP) address of the content or a host of the content. In an IP network, routing is based on host names (e.g., source and destination addresses). In a CCN by contrast, routing is based on a uniform resource identifier (URI) or similar identifier for a content object. CCN routing is performed hop-by-hop, using a longest prefix matching on the CCN name. All communications seeking to access data are framed as a request and response transaction. A CCN client sends a message referred to as a CCN interest to the nodes in the CCN. The nodes of the CCN respond with a content object identified by a CCN name in the CCN interest. These CCN content objects are returned via a CCN response.

All content object packets are cryptographically signed by their initial provider. A CCN client can thus verify the integrity and authenticity of the content even if the packet comes from untrusted links or untrusted hosts. As a direct effect, CCN nodes in the CCN network are allowed to cache packets locally in a table called the content store. When a CCN network node receives a CCN interest packet, it can check whether its local content store has the requested content object and can send it back if found. The look up in the content store is by the CCN name. If the CCN name is not found in the local content store, then the CCN interest is forwarded according to entries for the CCN name in a forwarding information base (FIB) of the CCN network node.

Using the naming conventions of CCN, one name identifies one content object. If a CCN client requires multiple content objects, then multiple corresponding CCN interests must be generated and sent. CCN does not provide convenient functions to facilitate the retrieval of content objects using their content names. For example, CCN clients cannot name a collection of content objects. If a group of related content objects are required, then the CCN client must send a separate CCN interest for each content object.

Named Function Networking is a recent academic proposal that allows computation units to be named via CCN, in addition to data. NFN allows data to be computed upon. As a trivial example, /companyx/whitepapers/real-time-cloud/pages/3/wordcount. Here, wordcount is a function that computes on the "page 3" data and produces the relevant word count as an object. NFN allows functions written using their prescribed lambda calculus to be executable on a Krivine machine, e.g. /companyx/whitepapers/real-time-cloud/pages/3/<Program code here>, where program code is a series of functional expressions written using lambda calculus.

SUMMARY

In one embodiment, a method is implemented by a node for implementing computational transformations conveyed in a content centric networking (CCN) request by a computation engine. The method includes receiving a CCN request containing a unique resource identifier (URI) and a computation field, decoding the computation field to determine a computation pipeline, retrieving a first content object identified by the URI, executing the computation pipeline with the first content object as input, and encoding a result of the computation pipeline as a second content object.

In another embodiment, a network device is configured to execute a method for computational transformations conveyed in a content centric networking (CCN) request. The network device includes a non-transitory computer-readable medium having stored therein a computation engine, and a processor coupled to the non-transitory computer-readable medium. The processor is configured to execute the computation engine, The computation engine is configured to receive a CCN request containing a unique resource identifier (URI) and a computation field, to decode the computation field to determine a computation pipeline, to retrieve a first content object identified by the URI, to execute the computation pipeline with the content object as input, and to encode a result of the computation pipeline as a second content object.

In one embodiment, a computing device is configured to execute a plurality of virtual machines for implementing network function virtualization (NFV), wherein a virtual machine from the plurality of virtual machines is configured to execute a method for computational transformations conveyed in a content centric networking (CCN) request. The computing device includes a non-transitory computer-readable medium having stored therein a computation engine, and a processor coupled to the non-transitory computer-readable medium. The processor is configured to execute the virtual machine. The virtual machine is configured to execute the computation engine. The computation engine is configured to receive a CCN request containing a unique resource identifier (URI) and a computation field, to decode the computation field to determine a computation pipeline, to retrieve a first content object identified by the URI, to execute the computation pipeline with the content object as input, and to encode a result of the computation pipeline as a second content object.

In a further embodiment, a control plane device is configured to implement a control plane of a software defined networking (SDN) network including a plurality of network devices implementing a method for computational transformations conveyed in a content centric networking (CCN) request. The control plane device includes a non-transitory computer-readable medium having stored therein a computation engine, and a processor coupled to the non-transitory computer-readable medium, the processor configured to execute the computation engine module, the computation engine configured to receive a CCN request containing a unique resource identifier (URI) and a computation field, to decode the computation field to determine a computation pipeline, to retrieve a first content object identified by the URI, to execute the computation pipeline with the content object as input, and to encode a result of the computation pipeline as a second content object.

BRIEF DESCRIPTION OF THE DRAWINGS

The invention may best be understood by referring to the following description and accompanying drawings that are used to illustrate embodiments of the invention. In the drawings:

FIG. 4B is a diagram of one example embodiment of the use of the process with a scalable network of sensors.

FIG. 7C illustrates various exemplary ways in which virtual network elements (VNEs) may be coupled according to some embodiments of the invention.

FIG. 7D illustrates a network with a single network element (NE) on each of the NDs of FIG. 7A.

FIG. 7E illustrates an example where each of the NDs implements a single NE (see FIG. 7D), but the centralized control plane has abstracted multiple of the NEs in different NDs into a single NE in one of the virtual network(s) of FIG. 7D, according to some embodiments of the invention.

FIG. 7F illustrates a case where multiple VNEs are implemented on different NDs and are coupled to each other, and where the centralized control plane has abstracted these multiple VNEs such that they appear as a single VNE within one of the virtual networks of FIG. 7D, according to some embodiments of the invention.

DETAILED DESCRIPTION

Figure 1:
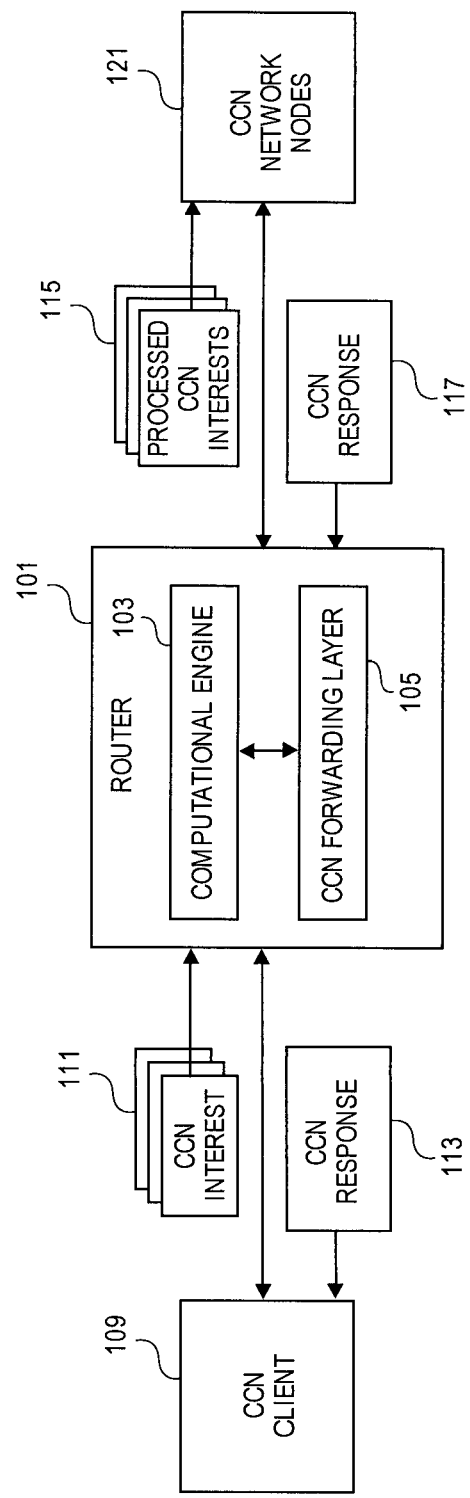
FIG. 1 is a diagram of one embodiment of a processing of a CCN interest at a node in the CCN network.

The following description describes methods and apparatus for implementing a system for *

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

Examples provided herein are with relation to a CCN, however, one skilled in the art would understand that the principles and structures described herein are also applicable to other ICNs. The implementation of the processes, functions and architecture are described with regard to CCN by way of example rather than limitation.

An example CCN architecture is provided by way of example to illustrate the processes and systems of the embodiments. The example CCN architecture and implementation provides an example of a receiver-initiated data flow model. CCN clients send CCN interest packets to the CCN network nodes to request content objects and data containers. The CCN node functioning as the original content object provider or any node (e.g., a router) in the CCN that has a cached copy of the content object can respond to the CCN interest with a CCN response containing the requested content object.

This model of communication can be referred to as a many-to-one retrieval. Many CCN clients can request the same piece of data (e.g., a content object) from a single original CCN provider. The CCN nodes can be optimized to service and aggregate requests and by caching content objects for servicing CCN interests. The embodiments work in combination with a one-to-many data retrieval model. With a one-to-many data retrieval model a CCN client can send a single CCN interest for a set of content objects rather than having to send a separate CCN interest for each requested content object. A 'set,' as used herein refers to any positive whole number of items including one item. In addition, in the embodiments presented herein below the CCN nodes can execute functions that process content objects and encapsulate the results to be returned to a requesting client. The support of functions is not limited to CCN interest packets, rather it can be supported in any type of CCN message.

The embodiments of the invention overcome the limitations of the prior art. These limitations in the CCN approach can include rigid naming requirements that essentially require each CCN interest to specifically identify each content object to be retrieved. The embodiments overcome these limitations, the embodiments provide a method by which functions can be defined along with a scheme for executing the functions to be performed. Correlated caching and encapsulation of the results of these functions is also set forth herein.

The embodiments provide advantages over the prior art systems. The introduced computational function support provides a mechanism through which content objects can be identified and processed by the CCN network to provide more specific and useful results that are derived from content objects in the CCN network. This reduces the amount of data traffic required to generate specific requests for content objects as well as reduces storage requirements since more data can be derived from a smaller subset of content objects using functions.

There are many potential use-cases for supporting functions in CCN, like in Internet of Things (IoT) scenarios, where requester ("client") applications may only need aggregated or derived information processed from a set of content objects, instead of the entire set of data. In the simplest case, the content object could be numeric fields running to millions of entries, and the client is only interested in the $k^{th}$-statistic (mean, median . . . ) of the data. The embodiments support a process and system within the CCN framework that can match user queries with the actual transformed content that they are interested in, without being wasteful of bandwidth and the energy required to engage in communication to transfer millions of data entries back to the client application.

As discussed above Named Function Networking (NFN) introduces a process to allow functions to be directly executed on content objects in a network. However, the scheme requires the use of machines that can reduce lambda-calculus expressions to perform the execution of the function. The lambda-calculus expression reducers (e.g., a Krivine machine) are computationally expensive and extremely slow for practical usage. Another notable limitation with this approach that hinders practical use is the encoding of the 'functional program' in the uniform resource identifier (URI) directly. In contrast, CCN headers have inherent space limitations on how much data will be allowed in the URI, and also this introduces problems in real-life networks where router hardware needs to process, store, and cache URI's that become extremely long. Thus, NFN is impractical for real-world deployment.

The embodiments overcomer the natural limitations of CCN to address the issue of 'compute' functionality in the network and also the need for a simple, practical, deployable solution that does not suffer from performance or practicality issues such as those discussed above in regard to NFN. In addition, the embodiments provide a process and system for defining and applying a pipeline of transformations to a set of N content objects that can be obtained using a single query with at least one "CCN Name Pattern." The embodiments provide a process and system where a single CCN query can combine both the collection of N content objects and the transformation of these N content objects into M content objects via computational functions.

The embodiments introduce a new mechanism for carrying a set of computational transforms in a CCN message, e.g., a CCN interest or request, using an encoding such as the type length value (TLV) format from CCNx version 1.0. The computational functions or transforms are intended to be trusted units of executable code for a specific computation environment, and can be based on parametric inputs. CCN nodes (i.e. CCN routers) that host the computation environment can execute such a trusted unit of computation. In the embodiments, these functions are referentially transparent and do not cause any side-effects or state changes to other functions executed locally or on the network.

The embodiments provide a process and system where a pipeline of parallel and serial computational functions can be realized, that allows a (single, or set of) content objects to be transformed in possibly M different ways. When combined with CCN Name Patterns, which provide a process that can retrieve N content objects with a single query, the embodiments allow a CCN network node, such as a CCN router, to perform M computational functions on N content objects with a single request or CCN message.

Thus the embodiments of the invention add data transformation capability to CCN requests and messages. Transformations can be executed by a computation engine at a CCN node such as a CCN router (in-network), or at specified nodes dedicated to this task, such as compute nodes in a cloud or compute blades in a rack (next-to-network). These architectural variants are discussed further herein below.

The CCN message or request carries a CCN URI (as in the CCN standard) and a list of computations to be performed on the data identified by that CCN URI. To illustrate, M represents the number of computations specified in the request, and N the number of content objects that match the CCN Name, without CCN Name Patterns, N can at most be 1. The embodiments provide a process and system where a single CCN interest or similar CCN message can trigger up to N*M individual computations, which in turn will produce between 1 and (N*M) content objects, depending on the compute pipelines defined (1-to-1, or reducer N-to-1) grouped into a single response, and sent back to the requester in a response message. Individual computation results for the tuple (content object and computational function sequence) can be cached independently and reused for later queries. Although, in principle, the embodiments provide functionality similar to NFN, the embodiments have significant advantages over NFN including, being feasible to implement on standard CNN node hardware, not requiring any special language capability to parse the "programs" embedded in the CCN URI, and not polluting CCN URI namespace with "programs." In addition, in some embodiment, interests with data transformations are handled with a special identifying format, such as interests##Digest(program). This is an example of an aspect that avoids polluting CCN UIR namespace.

FIG. 1 is a diagram of one embodiment of the CCN implementation for supporting computational functions. In this example, the network representation has been simplified to show the basic flow and operation of the CCN layer. In the example, a CCN client 109 generates a set of CCN interests 111 that can define computational functions, these CCN interests 111 are forwarded toward the CCN network nodes 121 that include the CCN originating device for the requested content objects to be processed by the functions. A CCN client 109 can be any type of device including a personal computer, handheld device, smartphone, console device or similar device. The CCN client 109 can request any content object in the namespace of the CCN. The requested content can be identified using a CCN name, which can include a regular expression.

The CCN interest is received at a router 101 or similar CCN node that is in communication with or a part of the CCN network 121. The router 101 implements a computation engine 103 and forwarding layer 105. The CCN forwarding layer 105 looks up CCN names and determines a next hop or egress port for forwarding the CCN interest 111 toward the node hosting the data. The forwarding layer can also identify CCN interests 111 where a function has been included, such as a function defined in a computation field or similar structure.

A check can be made whether the identified content object is cached by the router 101. In these cases, the CCN interest or the content object can be forwarded to the computation engine 103 for further processing as is described in further detail herein below.

The computation engine 103 can process the retrieved content object according to the defined function. The function can define a serial and/or pipelined set of operations to perform over the content object. If these content objects are locally cached then a CCN interest does not have to be sent out, however, if not locally cached then the CCN interest 115 is provided to the CCN forwarding layer 105 to be sent toward the originating CCN network nodes 121.

The originating CCN network nodes 121 can service the processed CCN interests 115 and return a set of CCN responses 117, with one CCN response for each requested content object. In some embodiments, the CCN network nodes can also support aggregation and can return a CCN aggregated response with multiple content objects over which the functions can be executed. The computation engine processes the returned set of content objects and generates a derived set of content objects to be forwarded back to the CCN client 109 via the CCN forwarding layer 105 in a CCN response 113.

Computational Function Definition

The embodiments can utilize packet fields in CCN requests and similar messages. CCN version 1.0 added this feature, enabling the addition of payloads and custom headers to CCN interest packets. In the absence of CCN 1.0 (such as an older version CCN or with other protocols), then this capability is added to the protocol.

In one embodiment each computational function can be defined such that a function (e.g. ComputeFunction) can take a content object and in some embodiments a set of parameters as input. The function outputs a set of content objects. This can be expressed as, ComputeFunction (parameters, input content objects)→output content objects. In some embodiments, the functions can receive lists or sets as input. For example, the functions can take a list of 'input content objects' along with an optional list of parameters which again can be CCN names or raw data. The functions such as the example 'ComputeFunction' will be executed in the run-time environment of a computation engine executed by a CCN node or similar device and produce one or more output content objects.

Figure 2A:
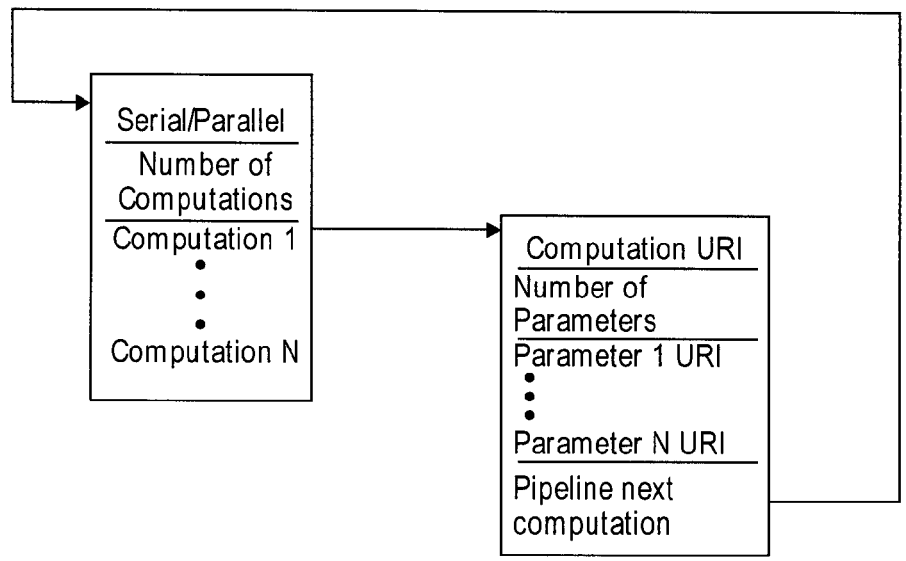
FIG. 2A is a diagram of an example of an encoding of a computation field in a CCN message.
Figure 2B:
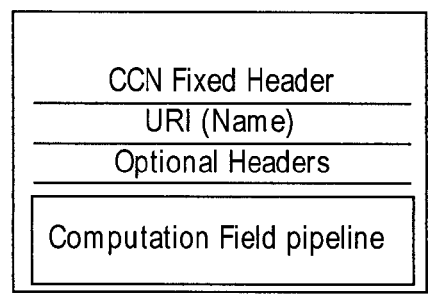
FIG. 2B is a diagram of one embodiment of a CCN interest packet.

FIGS. 2A and 2B are diagrams that illustrate example embodiments of how the computation field can be encoded to support the serial and parallel pipelining of computations defined by the computational functions. The encoding can be done in one or more ways, but can be summarized to have the following generalized structure, where [ ] indicates a list, and ( ) indicates a packet formatting section. The encoding can be in the form of a Computation: [ComputeFunction URI, Parameter URI, Pointer to next computation], a chained computation pipeline: [(Serial/parallel), Number of computations, [Individual computations]], or a CCN Request: (Fixed Header, Request URI, Optional Headers, (Chained computation pipeline), . . . ).

Referring to FIG. 2A, the computational functions can use pointers or references to other computational functions in their definitions. FIG. 2A shows a computational function defined in two recursive blocks, where each block is a different type of encoding showing that multiple encodings can be utilized with one another. In the first block a computational function is structured as a chained computation pipeline, where the first block indicates whether the computational function is serial or parallel, then identifies a number of computations to be performed, then identifies the computational functions to be executed including computation 1 that references the second computational function block. The second computational function block is structured as a computation providing a URI for the computational function, a number of parameters in a set of parameters provided as input, the list of the URI of each parameter and a pointer to the next block in the pipeline. This encoding is provided by way of example and one skilled in the art would understand that any type of encoding capable of identifying the functions, parameters and defining a hierarchy of serial and/or parallel computational functions can be utilized.

FIG. 2B is a diagram of one embodiment of a CCN message with a computation function defined therein. The CCN message includes a CCN fixed header as defined by the CCN 1.0 or later standard. The CCN message also includes a URI or CCN name to identify a content object. A set of optional headers as defined by the CCN 1.0 or later standard can also be present. One of the optional headers that is present is the computation field or computational pipeline field that contains a computational function and/or a definition of a pipeline of such computational functions. The decoding and processing of such a CCN message is set forth herein below.

Figure 3A:
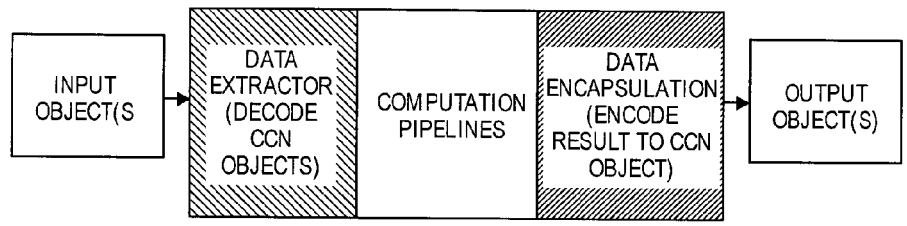
FIG. 3A is a diagram of one embodiment of an overall process for function execution.
Figure 3B:
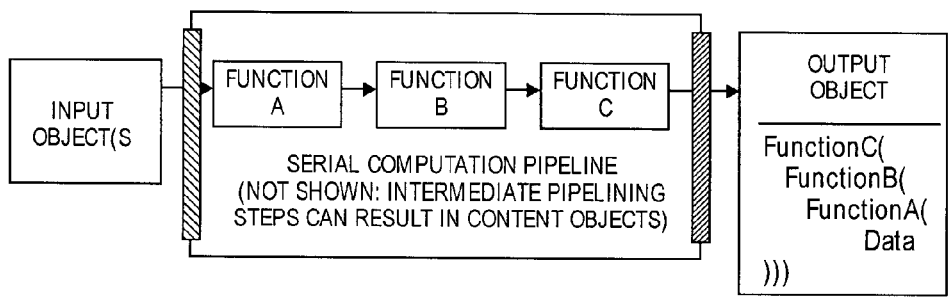
FIG. 3B is a diagram of one embodiment of a serial computation pipeline.
Figure 3C:
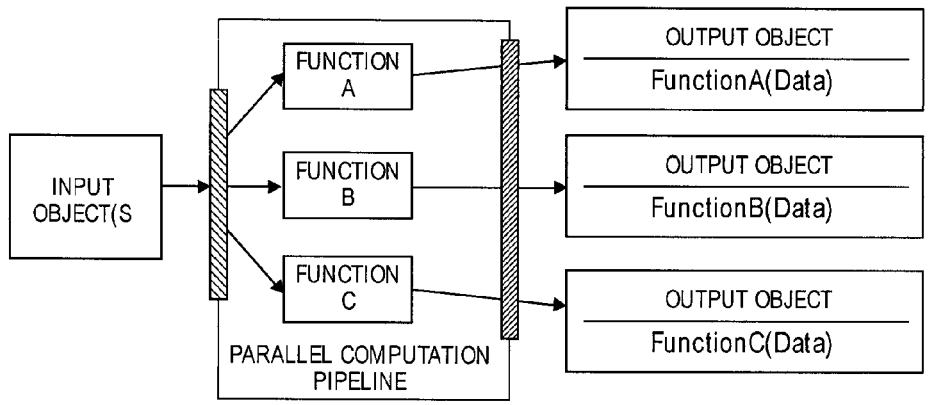
FIG. 3C is a diagram of one embodiment of a parallel computation pipeline.
Figure 3D:
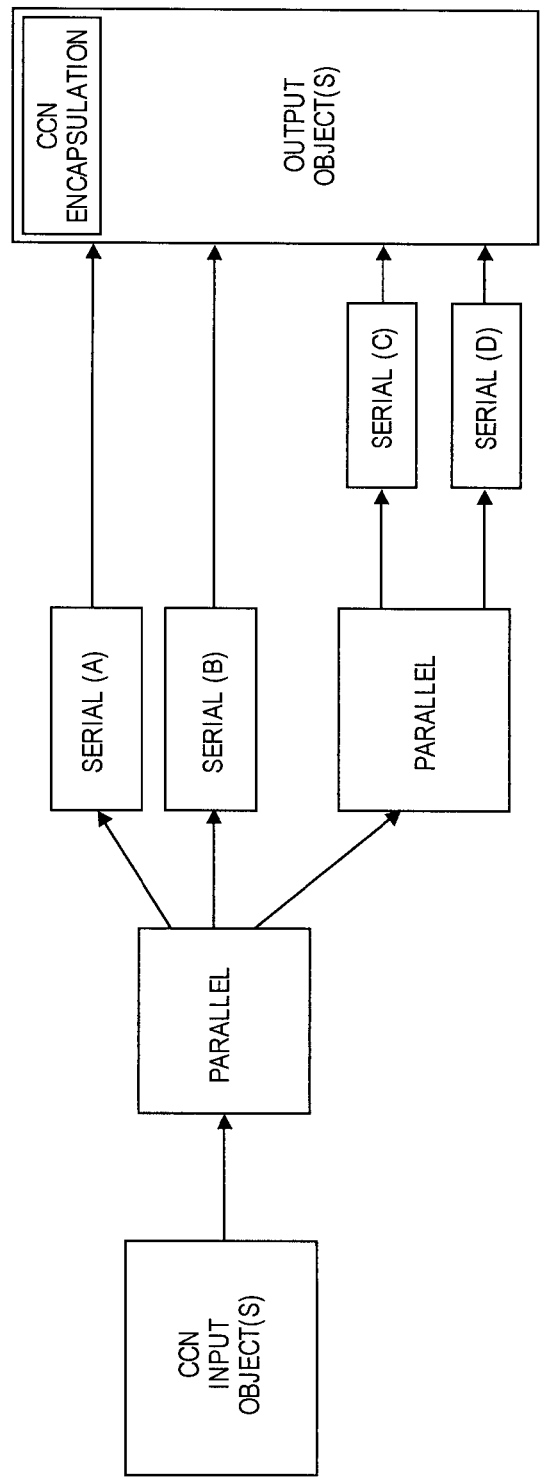
FIG. 3D is a diagram of one embodiment of a complex computation pipeline.

FIGS. 3A-3D are diagrams that provide example illustrations of how pipelines can be constructed in conjunction with computational functions where the pipelines and the computational functions are identified by CCN messages or similar data structures. Defining and processing pipelines involves an added step of unmarshalling or decoding data from CCN content object messages before passing it as input parameter to the computation pipeline, and a marshalling step to convert computational results into content objects as well as encapsulating these content objects into CCN response messages. The individual FIGS. 3A-3D show data can be fed to a computational pipeline that is composed of serial or parallel sub-pipelines. Also shown in FIG. 3D is an example of a complex pipeline where objects can be fed through a tree of computations to arrive at multiple computation results at the leaf nodes.

FIG. 3A is a diagram of one embodiment of an overall process for function execution. In one embodiment, the overall process operates on a set of input objects such as content objects or similar objects. These input objects can be content objects or similar data sets of objects that are to be processed and from which new data is to be derived. This process can be implemented by a computation engine or similar program or set of programs. The computation engine can encompass a data extractor or data extractor function to examine the input object and to decode and marshal the content objects to be processed according to a computational pipeline defined in the received message or data structure.

Once these content objects are decoded and the pipeline set up, then the identified content objects can be processed according to the computation pipeline as set forth in the examples herein below. The results of the computation pipeline can be a set of raw data and/or content objects. These content objects and data can then be encoded into a set of content objects to be output or encapsulated as a message such as a CCN message to be forwarded to a client application if the process was initiated in response to a CCN message such as a CCN interest being received.

FIG. 3B is a diagram of one embodiment of a serial computation pipeline. In this example a serial computation pipeline was specified and three functions identified, function A, function B and function C. The input content objects are provided to the serial pipeline starting with the first function in the pipeline, function A. The result of function A is provided to function B and the output of function B is provided to function C. The output of function C can then be prepared as an output content object. The illustration collapses the decapsulation and encapsulation, but both of these stages are present in this embodiment as well. The output can be a set of content objects or a CCN message including such content objects. In some embodiments, the intermediate results can be maintained as described further herein below with regard to caching.

FIG. 3C is a diagram of one embodiment of a parallel computation pipeline. In this example a parallel computation pipeline was specified and three functions identified, function A, function B and function C. The input content objects are provided to the parallel pipeline with all three functions in the pipeline, functions A, B and C receiving the same set of input content objects. The results of function A, function B, and function C can be separately output or can be combined into a single output in the encapsulation state. Again, the illustration collapses the decapsulation and encapsulation, but both of these stages are present in this embodiment as well. The output can be a set of content objects or a CCN message including such content objects. In some embodiments, the separate results can be maintained as described further herein below with regard to caching.

FIG. 3D is a diagram of one embodiment of a complex computation pipeline. In this example a complex computation pipeline was specified and four functions identified, function A, function B, function C and function D. The input content objects are provided to the complex pipeline starting with a first stage of the pipeline that defines a parallel processing of three sub-pipelines. The first sub pipeline is function A. The result of function A is provided to the output and encapsulation stage. The second sub-pipeline is function B. The result of function B is also provited to the output and encapsulation stage. The third sub-pipeline includes functions C and D that are executed in parallel. The separate outputs of functions C and D can then be provided to the output and encapsulation stage. The results provided to the output and encapsulation stage can be prepared as an output content object. The illustration collapses the decapsulation and encapsulation, but both of these stages are present in this embodiment as well. The output can be a set of content objects or a CCN message including such content objects. In some embodiments, the intermediate results can be maintained as described further herein below with regard to caching.

Figure 4A:
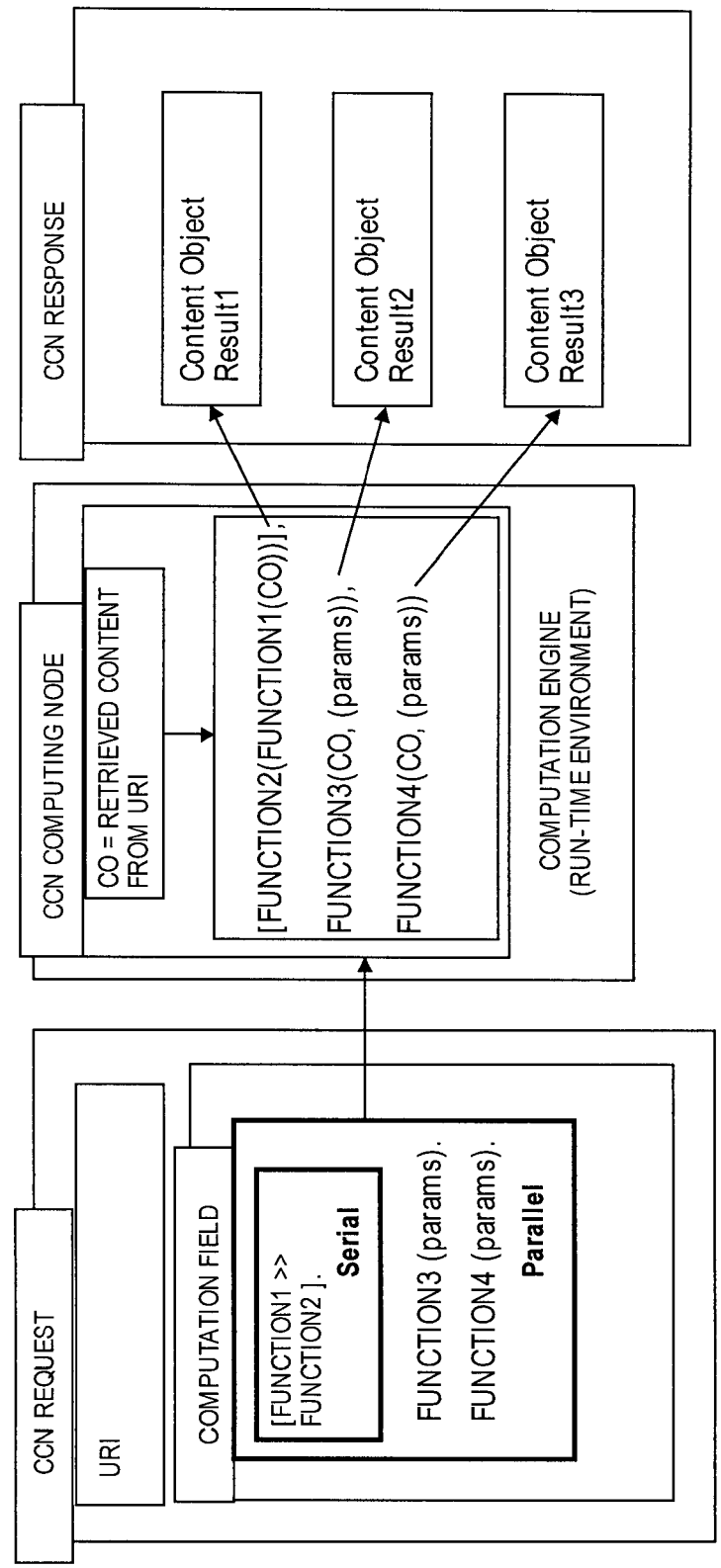
FIG. 4A is a diagram of one example embodiment of the use of a computation engine with CCN interest processing.

FIG. 4A is a diagram of one example embodiment of the use of a computation engine with CCN interest processing. FIG. 4A is a diagram of an example CCN message or a CCN 'computational' request that includes a computation field. The computation field identifies four functions, functions 1-4. The computation field also defines the hierarchy or structure for processing these functions. In the illustrated example this computation field illustrates how serial and parallel pipelines are built. The computation field contains three computations a first serial block, function 3 and function 4 that are in parallel. The data pointed to by the URI of the CCN request can be a CCN name that is passed to each of these three computations, in parallel or the identified content object can be retrieved by the computation engine and passed to each of the parallel computations. The first computation is a list of functions, function 1 and function 2, to be applied serially. The other two computations, function 3 and function 4, are functions to be applied in parallel. The parameters (params) are used to illustrate that functions themselves may be parameterized, in addition to the mandatory input content object.

The run-time execution engine referred to as the computation engine consumes the content object as input, un-wraps the raw data from it, and executes the computations identified in the CCN request in the manner specified by the structure and hierarchy (i.e. parallel, serial and/or complex). The computation engine can be hosted at a node in-network (as in Active Networks) or next-to-network (as in Cloud computing). The results from the computations of the functions can be output as a set of content objects or similar structures, which can be in turn encapsulated as a CCN response or similar message.

Caching

In one embodiment, the process and system includes a process for caching content objects as an integral aspect of CCN. The process involves the storing of the results of computations on content objects that can be cached as new content, with their own unique names. CCN nodes that perform forwarding and caching identify content based on the CCN Name (or URI). In CCNx 1.0 the CCN nodes use exact matching, while prior CCN versions and other protocols may use longest-prefix matching, both on the name of the content objects only. So if two CCN interest messages differ only by non-name packet fields, like optional headers or payload, the CCN nodes cannot tell the difference. In the embodiments described herein, two requests asking for the same piece of data but with different functions applied to it will look like two different things to CCN nodes as set forth below to avoid confusion. To avoid generation of identical names the process injects hashes into the names.

Using hashing a CCN interest for a CCN name (ccn://companyx/whitepapers/real-time-cloud) along with a computation field is transformed to a unique name via dataURI##Hash(Computation Field). In other words, the run-time environment (i.e. the computation engine) uses the CCN hash algorithm (typically SHA-256) over the packet-encoded computation field, and appends the result to the CCN name.

The process also supports caching individual (i.e. intermediate) computations. A computation pipeline consists of many different sub-paths in a tree. A run-time environment performing a computation can store each intermediate result using the hashing mechanism. A simple example involves a pipeline where a content object is input into the complex pipeline, in this example a pipeline involves a serial computation of Function A, followed by parallel computations Function B and Function C on the previous result. Such a computation can be broken down and cached into its sub-path components: DataURI##MD5(Function_A); DataURI##MD5(Function_A>>Function_B), and DataURI##MD5(Function_A>>Function_C). Using intermediate caching of sub-paths in the tree, nodes can respond to computation requests, such as DataURI##MD5(Function_A), without recomputing the intermediate steps. This result can also disseminated into the network and cached using CCN.

FIG. 4B is a diagram of one example embodiment of the use of the process with a scalable network of sensors. In this example, a use case is presented where sensors have been deployed large-scale on a CCN network, and users are interested in performing computations on the data. The traditional CCN way of doing this would involve a query for each individual sensor, getting a response for each value, then aggregating and computing on the client node. Using CCN name patterns, the client application can send a single request, and get a single response (possibly fragmented) with all of the values. This saves request messages (i.e. there is one request message instead of N), and for responses, this saves packet headers. However, the client application still gets all of the data. In the example it would be preferred to only obtain an average, or a subset, or an otherwise transformed result out of all the data, rather than all of the data set.

In the example, a use case for an Internet of Things (IoT) scenario is illustrated that involves collecting temperature values, in Fahrenheit degrees, from sensors. In this specific case a network is used to perform computations on a set of collected temperature values from the sensors before returning the result to the original query originator. The following URI collects temperature in Fahrenheit from all sensors of a company x across all the buildings of company x. An example data URI could be /companyx/buildings/*/rooms/*/tempF. However in this example, the there is only an interested in obtaining the set of values in Celcius degrees, as well as the mean and median of the set of temperature readings.

In the example, the following definition of the computation units is used to build the pipeline:
ToCelcius::List of Floats→List of Floats
Mean::List of Floats→Float
Median::List of Floats→Float The following CCN interest message with the contents below is sent to retrieve a list of temperature values and perform data transformations.

```
CCN Interest message
Data URI: /companyx/buildings/*/rooms/*/tempF
Computation TLV: [
[ToCelcius, Mean],
[mapAdd(-32), mapMultiply(5), mapDivide(9), Mean]
ToCelcius,
Mean,
Median
]
```

The URI uses a regular-expression name pattern to retrieve a list of temperature values in Fahrenheit. The CCN request includes computations that illustrate how multiple computations can be done both in parallel and serial to retrieve the data with the following transformations: Convert to Celcius then compute arithmetic mean (List of Float→List of Float→Float); Same as previous, except using mathematical functions with parameters to realize the conversion formula, $C=(F-32)*5/9$; Convert each value to Celcius (List of Float→List of Float); Compute mean of list of temperatures (List of Float→Float); and Compute median of list of temperatures (List of Float>Float).

Thus, the embodiments provides a new mechanism that allows a network to schedule computations on data. A computation is an atomic executable unit that can be applied at a CCN node (router or computer) on a single or set of content objects. Computations can be chained into a sequence of one or more individual computations. Chained computations can be organized together into a list of parallel computations to be performed on the data. With this recursive tree structure, a pipeline of different sets of functions can be applied to a single or set of content objects to produce a result for each such path built from the pipeline.

By encoding a list of computations in the payload of CCN requests, a user can directly obtain original data transformed by the list of computations. If a single content object was retrieved, the query can retrieve M CCN result objects (with M the number of computations included in the pipeline). CCN Name Patterns (such as that of patent application Ser. No. 14/513,100) allow up to N CCN data objects to be retrieved network-wide with a single query. Pairing this invention will now allow up to M*N CCN result content objects to be produced using a single CCN request.

Figure 5:
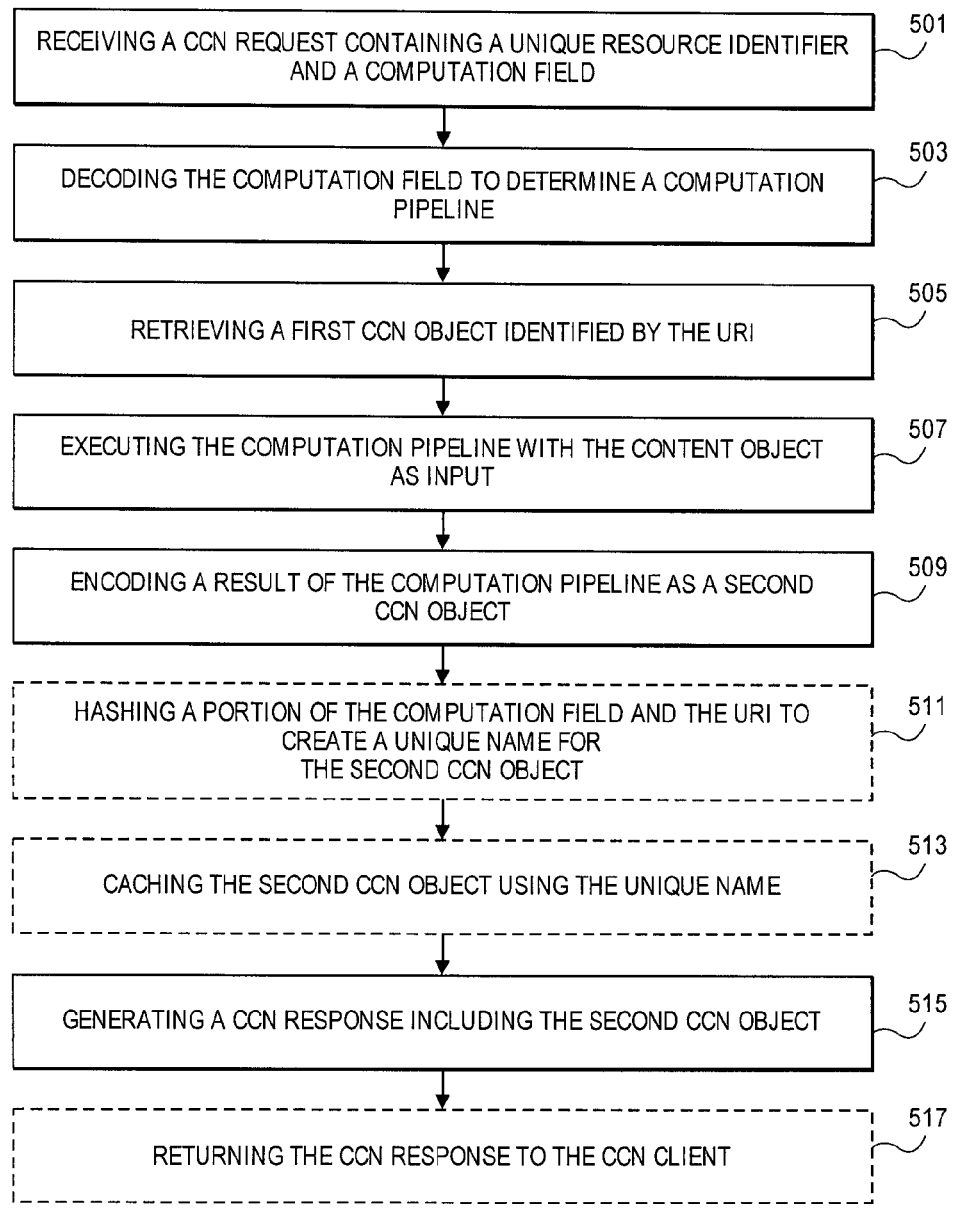
FIG. 5 is a flowchart of one embodiment of the processing of functions in CCN messages.

FIG. 5 is a flowchart of one embodiment of a process for executing a computation function in a CCN request. The example of a CCN request is provided by way of example rather than limitation. The process can be carried out by a computation engine at any CCN node or similar computing devices as described herein below. The process can be initiated in response to receiving the CCN request containing a unique resource identifier (URI) and a computation field defining a set of functions and the pipeline for executing them (Block 501). The computation engine decodes the computation field to determine a computation pipeline (Block 503). The process can then retrieve the content objects identified by the URI via the forwarding layer (Block 505).

The computation engine can execute the computation pipeline with the content object (or set of content objects) that has been retrieved as input (Block 507). The computation pipeline will generate a set of result data that can be encoded as at least one content object to be returned (Block 509).

Where the result content object and any intermediate content objects are to be cached, a portion of the computation field and URI is hashed to create a unique name for the generated content object (Block 511). Any portion or the computation field and/or URI can be utilized for the hashing input. The generated content object or the intermediate content objects can then be cached using this unique name (Block 513). The generated result content object can then be encapsulated in a CCN response message (Block 515) to be returned the requesting CCN client via the forwarding layer (Block 517).

Architecture

Figure 6:
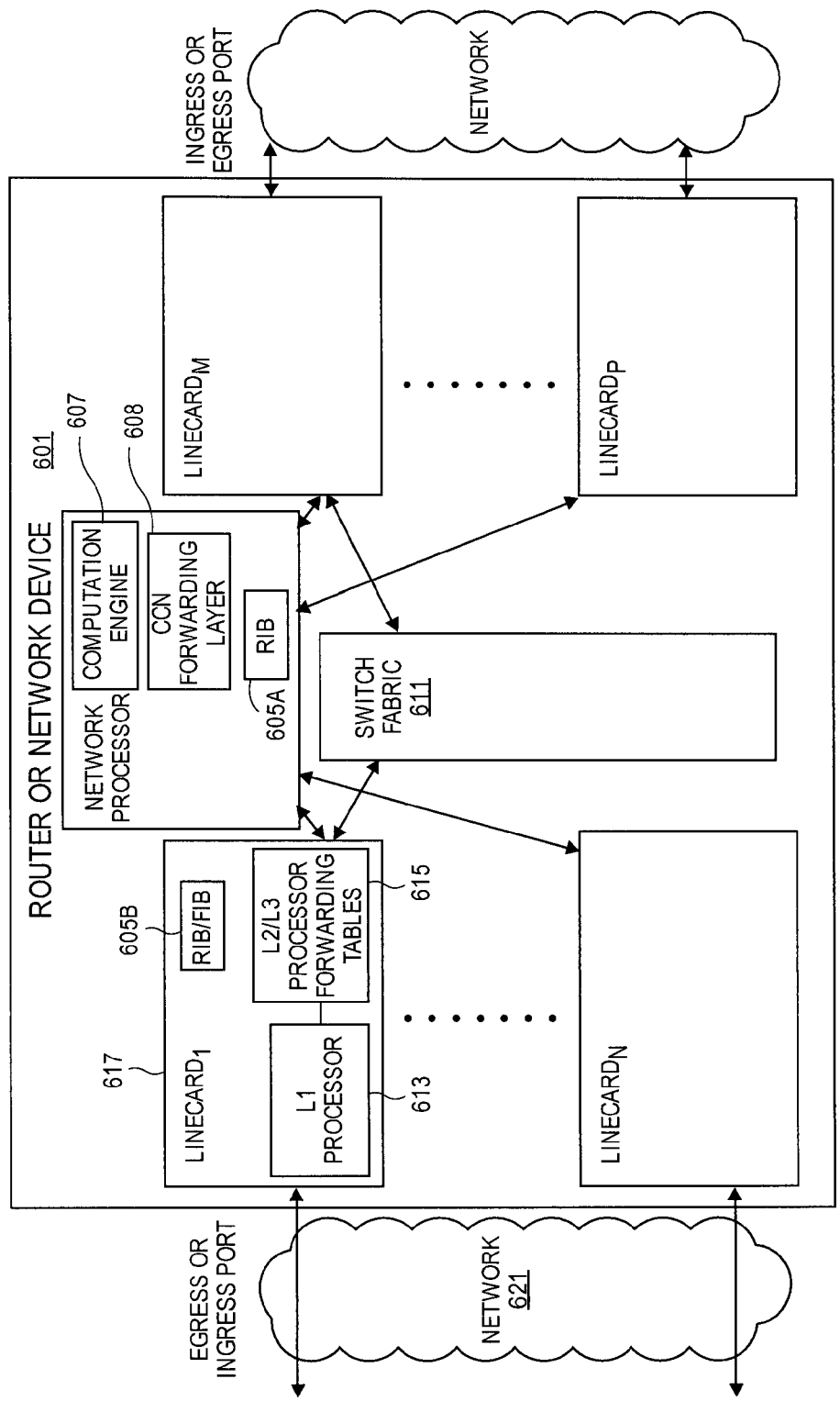
FIG. 6 is a diagram of one embodiment a network device (ND) implementing an asynchronous BFD session with support for explicit return paths.

FIG. 6 is a diagram of one embodiment of a network device implementing a CCN node or CCN router. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a router 601 or network device or similar computing device. The router 601 can have any structure that enables it to receive data traffic and forward it toward its destination. The router 601 can include a network processor 603 or set of network processors that execute the functions of the router 601. A 'set,' as used herein, is any positive whole number of items including one item. The router 601 or network element can execute a CCN forwarding layer 608 and computation engine 607 as described herein above via a network processor 603 or other components of the router 601. The network processor 603 can implement the CCN forwarding layer 608 and computation engine 607 as a discrete hardware, software module or any combination thereof. The network processor 603 can also service the routing information base 605A and similar functions related to data traffic forwarding and network topology maintenance. The functions of the CCN forwarding layer 608 and computation engine 607 can be implemented as modules in any combination of software, including firmware, and hardware within the router. The functions of the computation engine 607 and CCN forwarding layer 608 are executed and implemented by the router 601 include those described further herein above.

In one embodiment, the router 601 can include a set of line cards 617 that process and forward the incoming data traffic toward the respective destination nodes by identifying the destination and forwarding the data traffic to the appropriate line card 617 having an egress port that leads to or toward the destination via a next hop. These line cards 617 can also implement the forwarding information base 605B, or a relevant subset thereof. The line cards 617 can also implement or facilitate the computation engine and CCN forwarding layer functions described herein above. The line cards 617 are in communication with one another via a switch fabric 611 and communicate with other nodes over attached networks 621 using Ethernet, fiber optic or similar communication links and media.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figures 7A, 7B:
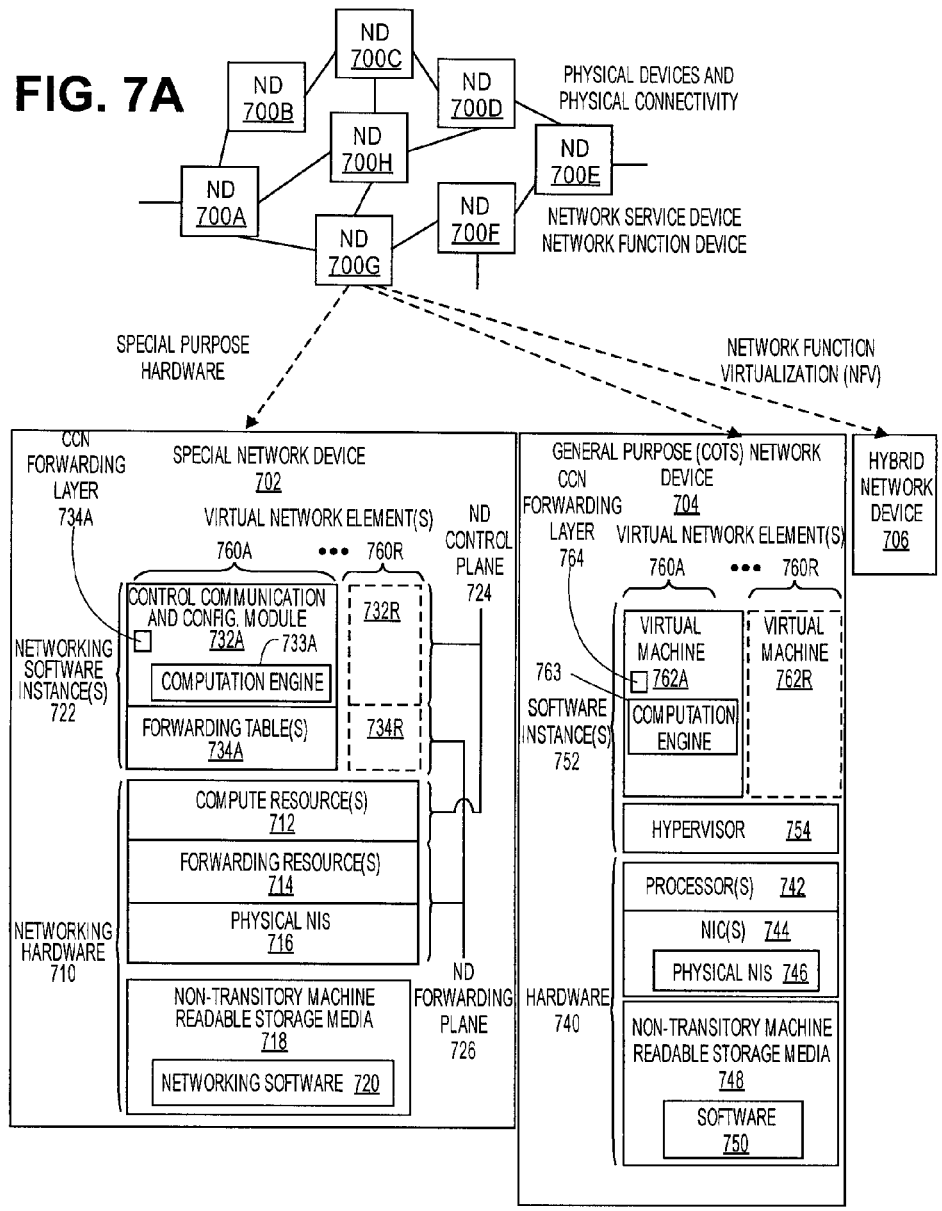
FIG. 7A illustrates connectivity between network devices (NDs) within an exemplary network, as well as three exemplary implementations of the NDs, according to some embodiments of the invention.
FIG. 7B illustrates an exemplary way to implement the special-purpose network device 402 according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link) An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A). In some embodiments, the control communication and configuration module 732A encompasses the computation engine 733A and CCN forwarding layer 734A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 416 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate a hypervisor 754 (sometimes referred to as a virtual machine monitor (VMM)) and one or more virtual machines 762A-R that are run by the hypervisor 754, which are collectively referred to as software instance(s) 752. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 762A-R, and that part of the hardware 740 that executes that virtual machine (be it hardware dedicated to that virtual machine and/or time slices of hardware temporally shared by that virtual machine with others of the virtual machine(s) 762A-R), forms a separate virtual network element(s) 760A-R. In some embodiments, the virtual machine module 762A encompasses Computation engine 763 and CCN forwarding layer 764.

The virtual network element(s) 760A-R perform similar functionality to the virtual network element(s) 730A-R. For instance, the hypervisor 754 may present a virtual operating platform that appears like networking hardware 710 to virtual machine 762A, and the virtual machine 762A may be used to implement functionality similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 762A-R differently. For example, while embodiments of the invention are illustrated with each virtual machine 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 754 includes a virtual switch that provides similar forwarding services as a physical Ethernet switch. Specifically, this virtual switch forwards traffic between virtual machines and the NIC(s) 744, as well as optionally between the virtual machines 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 4C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service— e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the virtual machines 762A-R may operate as servers; the same would be true for the hybrid network device 706; in the case of the special-purpose network device 702, one or more such servers could also be run on a hypervisor executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach). In some embodiments, the centralized reachability and forwarding module 779 encompasses Computation engine and CCN forwarding layer functions in corresponding Computation engine module 781 and CCN forwarding module 782 that implement CCN functionality as described herein above including support for regular expressions.

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 404 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

On the other hand, FIGS. 7E and 7F respectively illustrate exemplary abstractions of NEs and VNEs that the network controller 478 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 770I in one of the virtual network(s) 792 of FIG. 7D, according to some embodiments of the invention. FIG. 7E shows that in this virtual network, the NE 770I is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
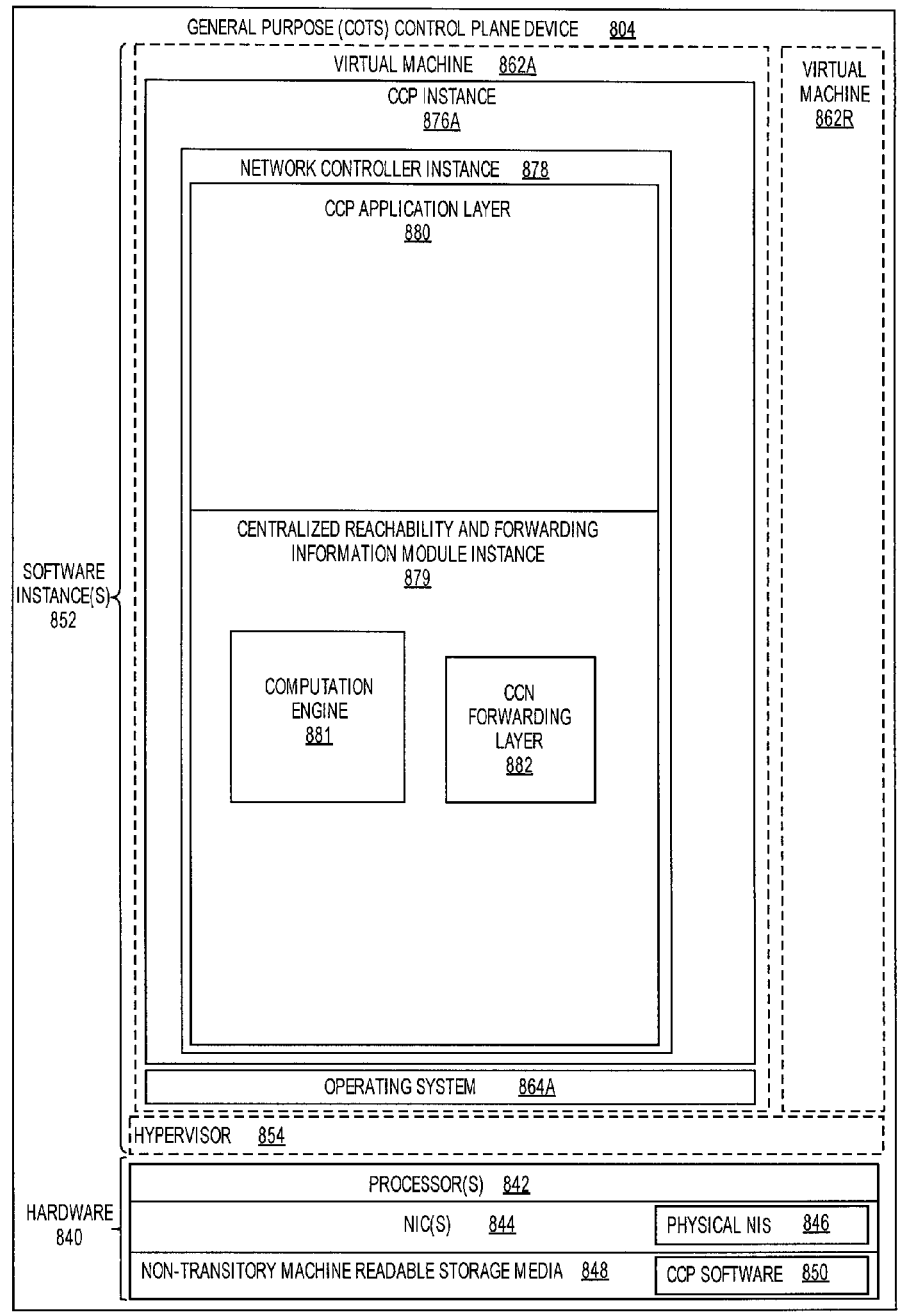
FIG. 8 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850.

In embodiments that use compute virtualization, the processor(s) 842 typically execute software to instantiate a hypervisor 854 (sometimes referred to as a virtual machine monitor (VMM)) and one or more virtual machines 862A-R that are run by the hypervisor 854; which are collectively referred to as software instance(s) 852. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 850 (illustrated as CCP instance 876A) on top of an operating system 864A are typically executed within the virtual machine 862A. In embodiments where compute virtualization is not used, the CCP instance 876A on top of operating system 864A is executed on the "bare metal" general purpose control plane device 804.

The operating system 864A provides basic processing, input/output (I/O), and networking capabilities. In some embodiments, the CCP instance 876A includes a network controller instance 878. The network controller instance 878 includes a centralized reachability and forwarding information module instance 879 (which is a middleware layer providing the context of the network controller 878 to the operating system 864A and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view. The CCP application can encompass the functionality of the Computation engine 881 and the CCN forwarding layer 882 as described herein above.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method implemented by a node for implementing computational transformations conveyed in a content centric networking (CCN) request by a computation engine, the method comprising the steps of:
   receiving the CCN request containing a unique resource identifier (URI) and a computation field;
   decoding the computation field to determine a computation pipeline;
   retrieving a first content object identified by the URI;
   executing the computation pipeline with the first content object as input; and
   encoding a result of the computation pipeline as a second content object.

2. The method of claim 1, wherein the CCN request is received from a CCN client, the method further comprising:
   generating a CCN response including the second content object; and
   returning the CCN response to the CCN client.

3. The method of claim 1, wherein decoding the computation field to determine the computational pipeline further comprises:
   establishing a serial pipeline of functions.

4. The method of claim 1, wherein decoding the computation field to determine the computational pipeline further comprises:
   establishing a parallel pipeline of functions.

5. The method of claim 1, wherein decoding the computation field to determine the computational pipeline further comprises:
   establishing a complex pipeline of functions including a hierarchy of parallel and serial functions.

6. The method of claim 1, further comprising:
   hashing a portion of the computation field and the URI to create a unique name for the second content object; and
   caching the second content object using the unique name.

7. A network device configured to execute a method for computational transformations conveyed in a content centric networking (CCN) request, the network device comprising:
   a non-transitory computer-readable medium having stored therein a computation engine; and
   a processor coupled to the non-transitory computer-readable medium, the processor configured to execute the computation engine, the computation engine configured to receive the CCN request containing a unique resource identifier (URI) and a computation field, to decode the computation field to determine a computation pipeline, to retrieve a first content object identified by the URI, to execute the computation pipeline with the content object as input, and to encode a result of the computation pipeline as a second content object.

8. The network device of claim 7, wherein the CCN request is received from a CCN client, the computation engine further configured to generate a CCN response including the second content object, and to return the CCN response to the CCN client.

9. The network device of claim 7, wherein decoding the computation field to determine the computational pipeline further includes establishing a serial pipeline of functions.

10. The network device of claim 7, wherein decoding the computation field to determine the computational pipeline further includes establishing a parallel pipeline of functions.

11. The network device of claim 7, wherein decoding the computation field to determine the computational pipeline further includes establishing a complex pipeline of functions including a hierarchy of parallel and serial functions.

12. The network device of claim 7, wherein the computation engine is further configured to hash a portion of the computation field and the URI to create a unique name for the second content object, and cache the second content object using the unique name.

13. A computing device configured to execute a plurality of virtual machines for implementing network function virtualization (NFV), wherein a virtual machine from the plurality of virtual machines is configured to execute a method for computational transformations conveyed in a content centric networking (CCN) request, the computing device comprising:
   a non-transitory computer-readable medium having stored therein a computation engine; and
   a processor coupled to the non-transitory computer-readable medium, the processor configured to execute the virtual machine, the virtual machine configured to execute the computation engine, the computation engine configured to receive the CCN request containing a unique resource identifier (URI) and a computation field, to decode the computation field to determine a computation pipeline, to retrieve a first content object identified by the URI, to execute the computation pipeline with the content object as input, and to encode a result of the computation pipeline as a second content object.

14. The computing device of claim 13, wherein the CCN request is received from a CCN client, the computation engine further configured to generate a CCN response including the second content object, and to return the CCN response to the CCN client.

15. The computing device of claim 13, wherein decoding the computation field to determine the computational pipeline further includes establishing a serial pipeline of functions.

16. The computing device of claim 13, wherein decoding the computation field to determine the computational pipeline further includes establishing a parallel pipeline of functions.

17. The computing device of claim 13, wherein decoding the computation field to determine the computational pipeline further includes establishing a complex pipeline of functions including a hierarchy of parallel and serial functions.

18. The computing device of claim 13, wherein the computation engine is further configured to hash a portion of the computation field and the URI to create a unique name for the second content object, and cache the second content object using the unique name.

19. A control plane device to implement a control plane of a software defined networking (SDN) network including a plurality of network devices implementing a method for computational transformations conveyed in a content centric networking (CCN) request, the control plane device comprising:

a non-transitory computer-readable medium having stored therein a computation engine; and a processor coupled to the non-transitory computer-readable medium, the processor configured to execute the computation engine, the computation engine configured to receive the CCN request containing a unique resource identifier (URI) and a computation field, to decode the computation field to determine a computation pipeline, to retrieve a first content object identified by the URI, to execute the computation pipeline with the content object as input, and to encode a result of the computation pipeline as a second content object.

20. The control plane device of claim 19, wherein the CCN request is received from a CCN client, the computation engine further configured to generate a CCN response including the second content object, and to return the CCN response to the CCN client.

21. The control plane device of claim 19, wherein decoding the computation field to determine the computational pipeline further includes establishing a serial pipeline of functions.

22. The control plane device of claim 19, wherein decoding the computation field to determine the computational pipeline further includes establishing a parallel pipeline of functions.

23. The control plane device of claim 19, wherein decoding the computation field to determine the computational pipeline further includes establishing a complex pipeline of functions including a hierarchy of parallel and serial functions.

24. The control plane device of claim 19, wherein the computation engine is further configured to hash a portion of the computation field and the URI to create a unique name for the second content object, and cache the second content object using the unique name.

* * * * *